(12) United States Patent
Lee

(10) Patent No.: US 9,310,972 B2
(45) Date of Patent: Apr. 12, 2016

(54) METHOD AND APPARATUS FOR CHANGING A PAGE IN E-BOOK TERMINAL

(75) Inventor: Young-Joo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 182 days.

(21) Appl. No.: 13/351,307

(22) Filed: Jan. 17, 2012

(65) Prior Publication Data

US 2012/0188154 A1    Jul. 26, 2012

(30) Foreign Application Priority Data

Jan. 20, 2011    (KR) .................... 10-2011-0005845

(51) Int. Cl.
*G06F 3/0483* (2013.01)
*G06F 1/16* (2006.01)

(52) U.S. Cl.
CPC ............ *G06F 3/0483* (2013.01); *G06F 1/1694* (2013.01); *G06F 2200/1637* (2013.01); *G09G 2354/00* (2013.01); *G09G 2380/14* (2013.01)

(58) Field of Classification Search
CPC ................ G06F 1/1694; G06F 3/0483; G06F 2200/1637; G09G 2354/00; G09G 2380/14
See application file for complete search history.

(56) References Cited

U.S. PATENT DOCUMENTS

| | | | |
|---|---|---|---|
| 5,602,566 A | 2/1997 | Motosyuku et al. | |
| 7,764,269 B2 | 7/2010 | Sohn et al. | |
| 2006/0195051 A1* | 8/2006 | Schnapp et al. | 600/595 |
| 2006/0244576 A1* | 11/2006 | Sugie et al. | 340/429 |
| 2007/0085845 A1* | 4/2007 | Kikuchi et al. | 345/204 |
| 2008/0101075 A1* | 5/2008 | Yoshida et al. | 362/418 |
| 2008/0129666 A1* | 6/2008 | Shimotono et al. | 345/87 |
| 2009/0237367 A1* | 9/2009 | Ryu et al. | 345/173 |
| 2010/0060475 A1* | 3/2010 | Choi | 340/689 |
| 2010/0127972 A1* | 5/2010 | Yadavalli et al. | 345/157 |
| 2011/0074671 A1* | 3/2011 | Shimosato et al. | 345/156 |
| 2011/0288893 A1* | 11/2011 | Francis | 705/5 |
| 2011/0313899 A1* | 12/2011 | Drey | 705/30 |
| 2012/0311438 A1* | 12/2012 | Cranfill et al. | 715/256 |

FOREIGN PATENT DOCUMENTS

KR    10-2010-0011357 A    2/2010

* cited by examiner

*Primary Examiner* — Aneeta Yodichkas
(74) *Attorney, Agent, or Firm* — Cha & Reiter, LLC.

(57) ABSTRACT

A method and apparatus for changing a page when an e-book terminal is inclined is provided. The method includes sensing that the e-book terminal is inclined to a left or right side, then changing a current page to a next page when the e-book terminal is inclined to the left side or changing the current page to a previous page when the e-book terminal is inclined to the right side.

23 Claims, 5 Drawing Sheets

METHOD AND APPARATUS FOR CHANGING A PAGE IN E-BOOK TERMINAL

CLAIM OF PRIORITY

This application claims the benefit under 35 U.S.C. §119 of a Korean patent application filed in the Korean Intellectual Property Office on Jan. 20, 2011 and assigned Serial No. 10-2011-0005845, the entire disclosure of which is hereby incorporated by reference.

BACKGROUND OF THE INVENTION

1. Field of the Invention

The present invention relates to an e-book terminal. More particularly, the present invention relates to a method and apparatus for navigating contents displayed in an e-book terminal.

2. Description of the Related Art

E-books are known generically as digital books displaying publications that have been recorded in an electronic recording medium or a storage device, thus allow users to read, see, and listen the recorded contents over wire/wireless information communication networks using computers or portable terminals. The e-books are more economical than paper books.

The users may save time by purchasing the e-books online, and may individually purchase only necessary parts of the e-books. The e-books are stored in an e-book terminal to allow the user to easily read the e-books anytime and anywhere.

The e-book terminal has also improved and become popular according to growing disseminations and recent popular demands for the e-books. These days, the e-book terminal has high resolution and provides various editing functions. Further, the e-book terminal has a button for changing pages. Thus, when the user glances at the e-book, he/she must repeatedly push the button for each page turn which in turn causes an overload in the e-book terminal.

SUMMARY OF THE INVENTION

An aspect of the present invention is to solve at least the above-mentioned problems and/or disadvantages and to provide at least the advantages described below. Accordingly, an aspect of the present invention is to provide an e-book terminal for changing a page when the e-book terminal is inclined.

Another aspect of the present invention is to provide a method and apparatus for differently setting a page change speed according to a tilt angle of an e-book terminal.

Another aspect of the present invention is to provide a method and apparatus for changing a page such that a user easily glances at e-book contents in an e-book terminal.

Another aspect of the invention provides a method of turning or navigating e-book contents displayed in an e-book terminal which includes: sensing whether the e-book terminal is inclined to a first orientation or second orientation from a reference angle; and changing a current page to a next page when the e-book terminal is inclined to the left orientation or changing the current page to a previous page when the e-book terminal is inclined to the second orientation.

Another aspect of the invention provides an apparatus for navigating e-book contents displayed in an e-book terminal which includes: a display unit for displaying the e-book contents; an input unit for receiving an input signal for changing a page of the e-book contents output on the display unit; a tilt sensor for outputting a tilt of the e-book terminal; and a controller for sensing whether the e-book terminal is inclined to a first or second orientation from a reference angle, changes a current page to a next page when the e-book terminal is inclined to the first orientation, and changes the current page to a previous page when the e-book terminal is inclined to the second orientation.

BRIEF DESCRIPTION OF THE DRAWINGS

The above aspects, features and advantages of certain exemplary embodiments of the present invention will be more apparent from the following detailed description taken in conjunction with the accompanying drawings, in which.

DETAILED DESCRIPTION

Exemplary embodiments of the present invention will be described herein below with reference to the accompanying drawings. For the purposes of clarity and simplicity, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention described hereinafter relates to a method and apparatus for changing a page when an e-book terminal is inclined by varying degree of angles. More particularly, the present invention relates to a method and apparatus for differently setting a page change speed according to an angle at which the e-book terminal is inclined.

Figure 1:
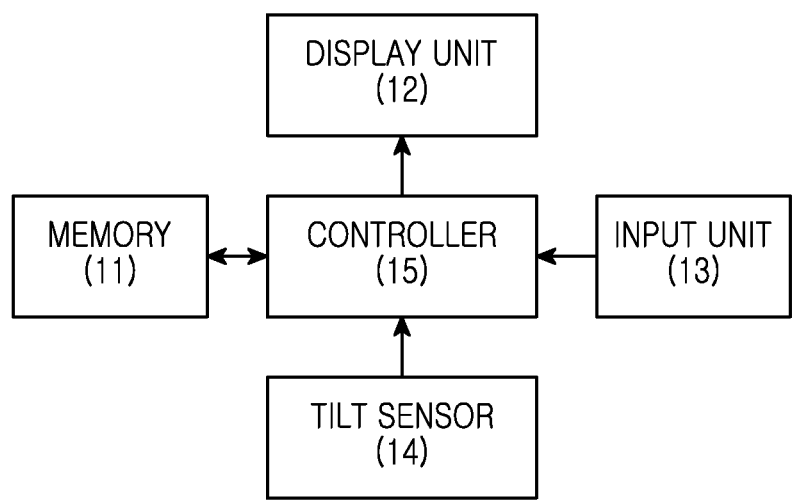
FIG. 1 is a block diagram of an e-book terminal according to one embodiment of the present invention.

FIG. 1 is a block diagram of an e-book terminal according to one embodiment of the present invention.

Referring to FIG. 1, the e-book terminal includes a memory 11 for storing displayed data, a display unit 12 for decoding the data stored in the memory and outputting an image signal, an input unit 13 for receiving an input signal for changing a page of e-book contents output on the display unit 12, a tilt sensor 14 for determining a tilt of the e-book terminal, and a controller 15 for controlling an overall operation of the e-book terminal. A known technique known to artisans may be used as the tilt sensor. The tilt sensor 14 may be replaced by a gyro sensor and an acceleration sensor.

Hereinafter, a page change method of the controller 15 according to the teachings of the present invention will be described in detail with reference to drawings.

Figure 2:
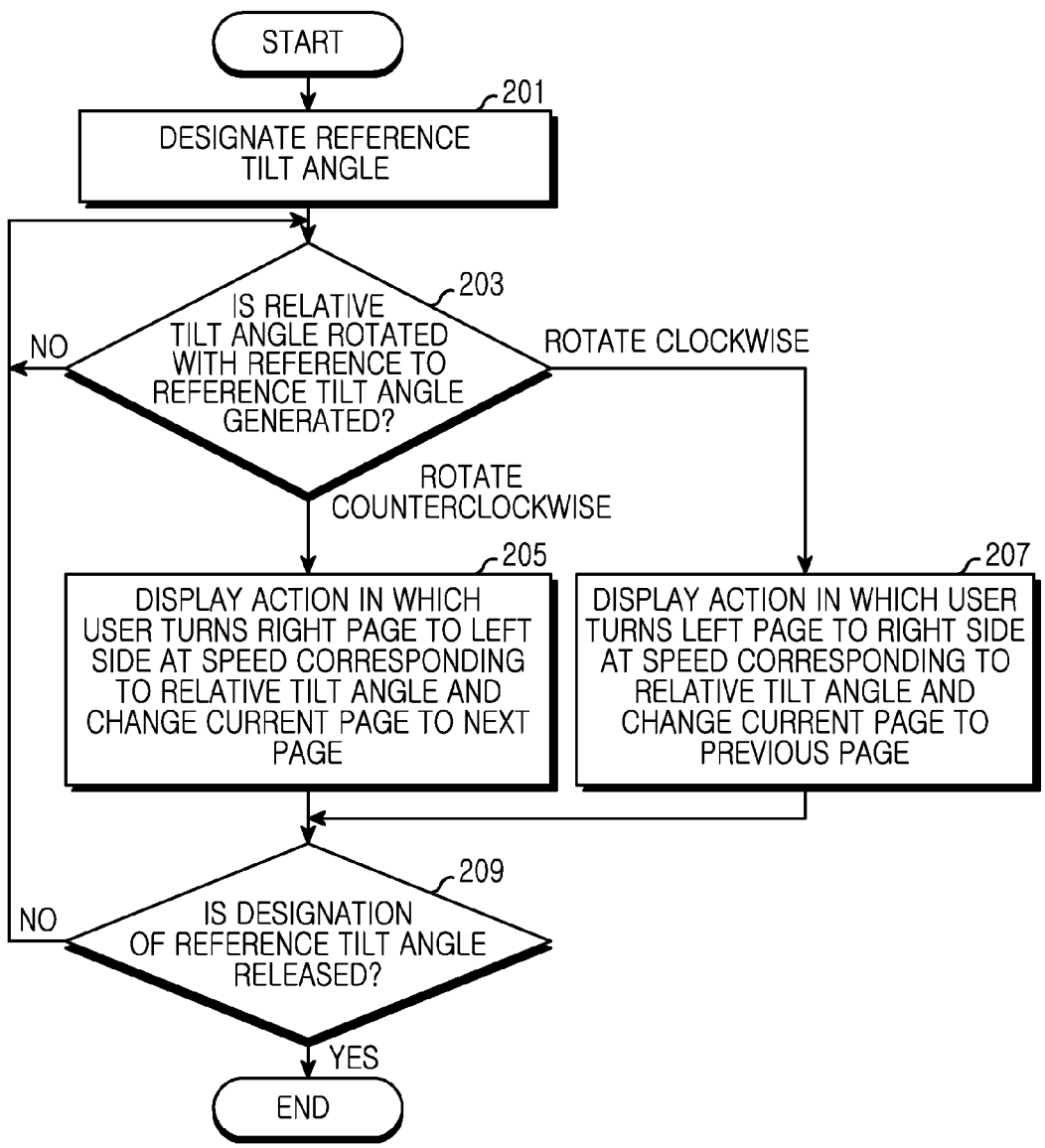
FIG. 2 is a flowchart illustrating a process of changing a page according to one embodiment of the present invention.

FIG. 2 is a flowchart illustrating a process of changing a page according to one embodiment of the present invention.

Briefly, an e-book terminal according to one embodiment of the present invention displays e-book contents on left and right pages like a paper book, displays an action as if a user turns a page of the paper book according to a corresponding signal, and changes a current page to a previous or next page. Particularly, if the user inclines the e-book terminal to a left side/orientation (or counterclock orientation), the e-book terminal displays an action in which a right page is turned to the left side and turns the current page to the next page. Similarly, when the user inclines the e-book terminal to a right side, the e-book terminal displays an action in which a left page is turned to a right side/orientation (or clockwise orientation) and turns the current page to the previous page. The tilt sensor 14 according to one embodiment of the present invention may confirm that the e-book terminal is inclined to a left orientation or right orientation, and may confirm about an inclined angle (left and right tilt) according to the following method.

If an X axis indicating a left and right direction, a Y axis indicating an upper and lower direction, and a Z axis indicating a vertical direction are designated on a picture which is in parallel with a horizontal plane, an angle (hereinafter referred to as a tilt angle) defined by the X axis and the horizontal plane may be an index indicating the left and right tilt. If the angle defined by the X axis and the horizontal plane is 0 degrees, it is meant that any one of a left page and a right page is not inclined. However, the angle defined by the X axis and the horizontal plane is not 0 degrees, it is meant that the X axis is rotated using the Y axis which is the axis of rotation. In an after-mentioned e-book terminal which displays upper and lower pages, an angle defined by the Y axis and the horizontal plane may be an index indicating an upper and lower tilt.

Referring to FIG. 2, the controller 15 designates a reference tilt angle (step 201). If a page change signal is generated, the controller 15 confirms and designates about an angle (reference tilt angle) at which an e-book terminal is currently inclined to a left or right side with respect to the horizontal plane from the tilt sensor 14. Here, if the page change signal is maintained, the previously designated reference tilt angle is maintained. If the page change signal is released, the previously designated reference tilt angle is released. For example, if a user pushes a button (hereinafter referred to as a page change button) for generating the page change signal to turn a page while he/she stands the e-book terminal aside at a 90 degree angle, the controller 15 designates the reference tilt angle as a 90 degree angle.

The controller 15 discriminates whether an angle (hereinafter referred to as a relative tilt angle) at which the e-book terminal is relatively rotated with reference to the reference tilt angle is generated (step 203). If the e-book terminal is rotated counterclockwise with respect to the reference tilt angle, that is, if it is inclined to a left page, the controller 15 displays an action in which the user is turning a right page to a left side at speed corresponding to the relative tilt angle and turns a current page to a next page (step 205). Conversely, if the e-book terminal is rotated clockwise, that is, if it is inclined to a right page, the controller 15 displays an action in which the user is turning a left page to a right side at speed in proportion to the reference tilt angle and turns the current page to a previous page (step 207).

In the embodiment, a page change speed is proportional to the relative tilt angle. That is, the higher the relative tilt angle, the quicker rate of displaying an action in which one page is sequentially being turned to another page. For example, although the user turns one sheet to change a page at a lower tilt angle, he/she may turn three sheets to change a page at a higher tilt angle.

Here, speed at which one sheet is being turned may be classified stage by stage according to the relative tilt angle. For example, the reference tilt angle is classified into stages such as a range 1 (e.g., 2 degrees to 10 degrees) and a range 2 (e.g., 11 degrees to 20 degrees). Thus, the controller 15 may selectively and differently set a speed for the respective stages. Accordingly, the controller 15 may adjust a page change speed by sensitively reacting to a minute movement by the user.

In addition, if the reference tilt angle is greater than or same to a predetermined threshold value, the controller 15 may change a page at speed in proportion to the reference tilt angle. Therefore, the controller 15 prevents a current page from being changed to an unintended page due to an inadvertent minute movement that can be generated at the same time that the user pushes the page change button.

If the designation of the reference tilt angle is released, that is, if the maintained page change signal is stopped (step 209), for example, by releasing the page change button, the controller 15 ends the procedure of FIG. 2. However, the page change signal is continuously maintained (step 209), the controller 15 performs the processes of step 203 to step 209 again.

Figure 3:
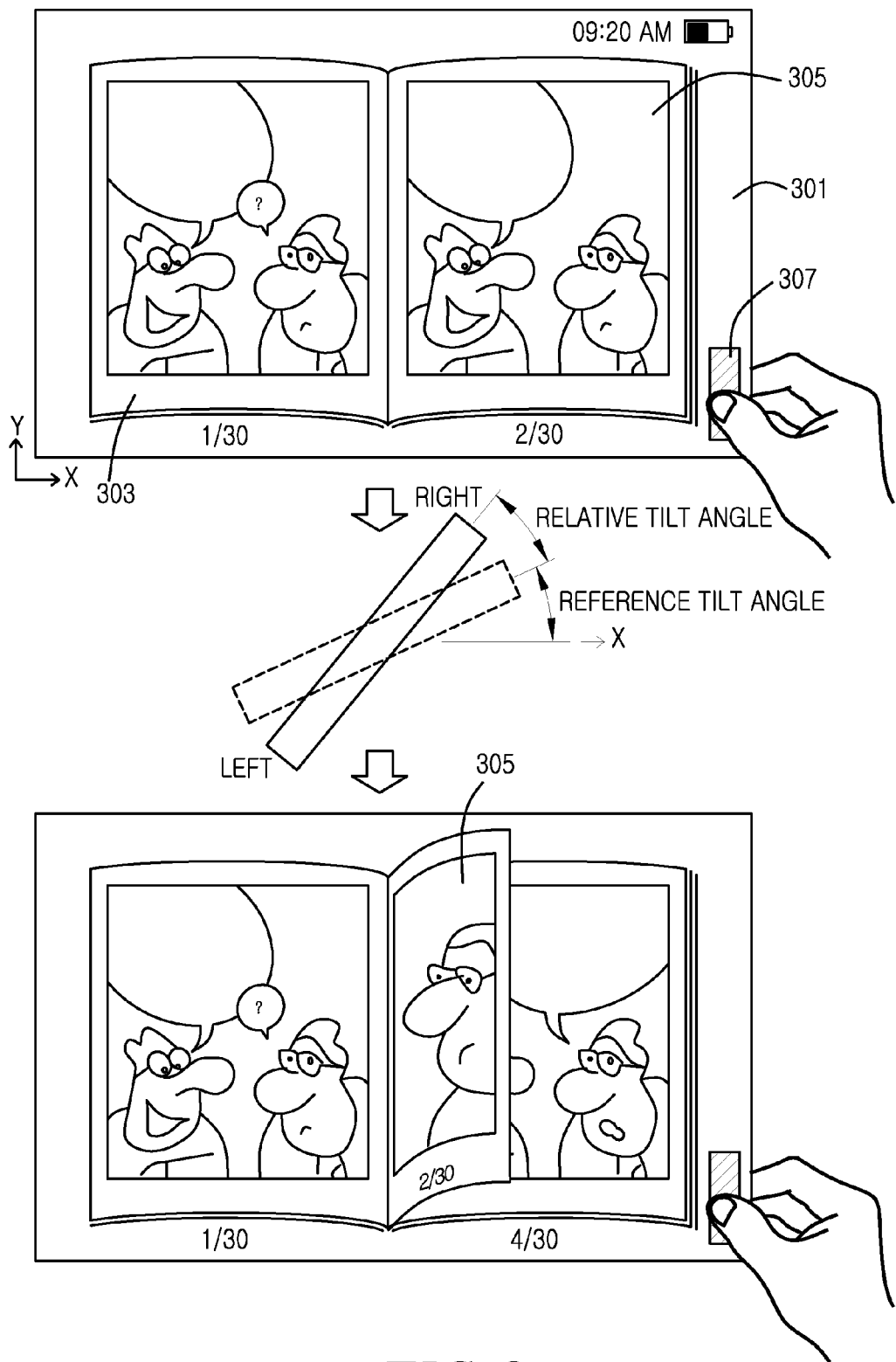
FIG. 3 illustrates a process of turning a page according to one embodiment of the present invention.

FIG. 3 illustrates a process of changing a page according to one embodiment of the present invention.

Referring to FIG. 3, an e-book terminal displays e-book contents on a left page 303 and a right page 305 of a picture 301 during a normal view mode.

As shown, the e-book terminal displays an action as if a user is turning a page of a paper book according to a corresponding signal and then changes a current page to a previous or next page. Hereinafter, examples which refer to drawings show a process of turning a right page to a left side, that is, a process of changing a current page to a next page. Since a process of changing the current page to a previous page is same, a description for the process is omitted herein to avoid redundancy.

If the user pushes a page change button 307 while reading e-book contents, the e-book terminal determines a current angle when the button 307 is activated as a reference tilt angle with respect to a horizontal plane. If the push of the page change button 307 is released at any time, the designated reference tilt angle is released.

In operation, if the user inclines the e-book terminal to a left side/orientation after pushing the page change button 307, the e-book terminal determines a relative tilt angle with respect to the reference tilt angle. Then, the e-book terminal displays an action in which a right page is being turned to a left side at speed in proportion to the relative tilt angle amount and changes a current page to a next page. Accordingly, the user may selectively and variably adjust a user's own speed to adjust the page turning rate according to the amount of tilt degree. Page change corresponding to the relative tilt angle is valid until the page change button 307 is released.

Thu, in a glance mode, the user can glance at e-book contents while changing a current page to a next page at a certain speed. For example, if the speed at which one sheet is being turned is differently set according to the range 1 (e.g., 10 degrees to 10 degrees) and the range 2 (e.g., 11 degrees to 20 degrees).

Particularly, when a page including a specific item of e-book contents exists while continuously changing and displaying a page or during a glance mode, the e-book terminal according to one embodiment of the present invention may halt the turning page briefly and may display a specific page for a certain time period and then resume to turning pages. For example, if a page having items such as drawings and graphs exists, the e-book terminal stops change to a next page for a certain time period and displays the page having the items. This enables the user to stop and have an opportunity to minutely examine a page that may be of interest to the user. Here, a change speed to the next page is considerably lowered. If the stopped time is passed, the e-book terminal resumes and continually performs change to a next page again at a corresponding speed.

In addition, the e-book terminal according to one embodiment of the present invention may highlight a specific item of e-book contents during a glance mode or while continuously changing and displaying a page. For example, in the above, example, the user may see items such as drawings and graphs displayed on a corresponding page that are relatively highlighted for distinction when the user glances at e-book contents during the glance mode.

Further, in case the relative tilt angle is sharply changed, for example, in case the user drops the e-book terminal when pushing the page change button 307 the e-book terminal may change a current page to an unintended page. To avoid this, if the relative tilt angle exceeds a predetermined threshold value during a page change mode, the controller 15 ends the page change mode, or bookmarks a corresponding page for a subsequent retrieval when the relative tilt angle exceeds the threshold value.

Figure 4:
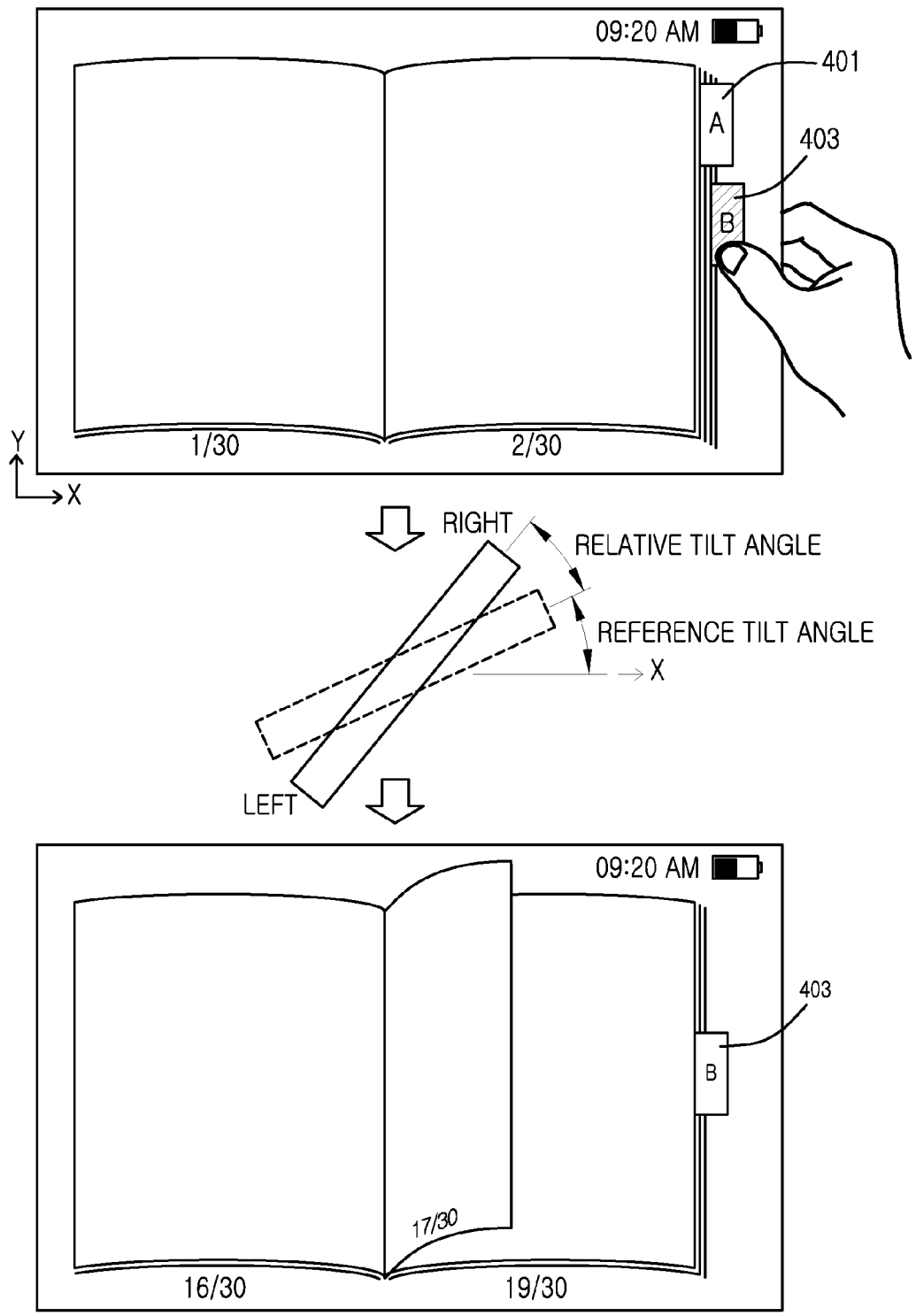
FIG. 4 illustrates a process of turning a page according to one embodiment of the present invention.

FIG. 4 illustrates a process of changing a page according to another embodiment of the present invention.

As shown, an e-book terminal displays e-book contents on a left page and a right page of a picture. Also, the e-book terminal displays an action as if a user is turning a page of a paper book according to a corresponding signal and changes a current page to a previous or next page. Also, the e-book terminal may provide indexes 401 and 403. Each of the indexes 401 and 403 indicates a page in which corresponding contents exist, and indicates a page in which corresponding contents are started. These indexes 401 and 403 may be designated by a user or an e-book contents provider. Particularly, each of the indexes 401 and 403 according to the embodiment of the present invention may use these buttons to trigger the page changing mode so that be a current page may be changed to a page indicated by a corresponding one of the indexes 401 and 403.

Further, if the user pushes a B index button 403 while reading e-book contents, the e-book terminal according to the embodiment of the present invention ascertains and designates a reference tilt angle currently indicating about a tilt angle with respect to a horizontal plane, as described with reference to FIG. 4. If the user inclines the e-book terminal to a left side/orientation when pushing the B index button 403, the e-book terminal confirms a relative tilt angle with respect to the reference tilt angle. Then, the e-book terminal displays an action in which a right page is being turned to a left side at speed in proportion to the relative tilt angle and then changes a current page to a next page at that determined rate. If the push of the B index button 403 is released anytime, the designated reference tilt angle is released.

Figure 5:
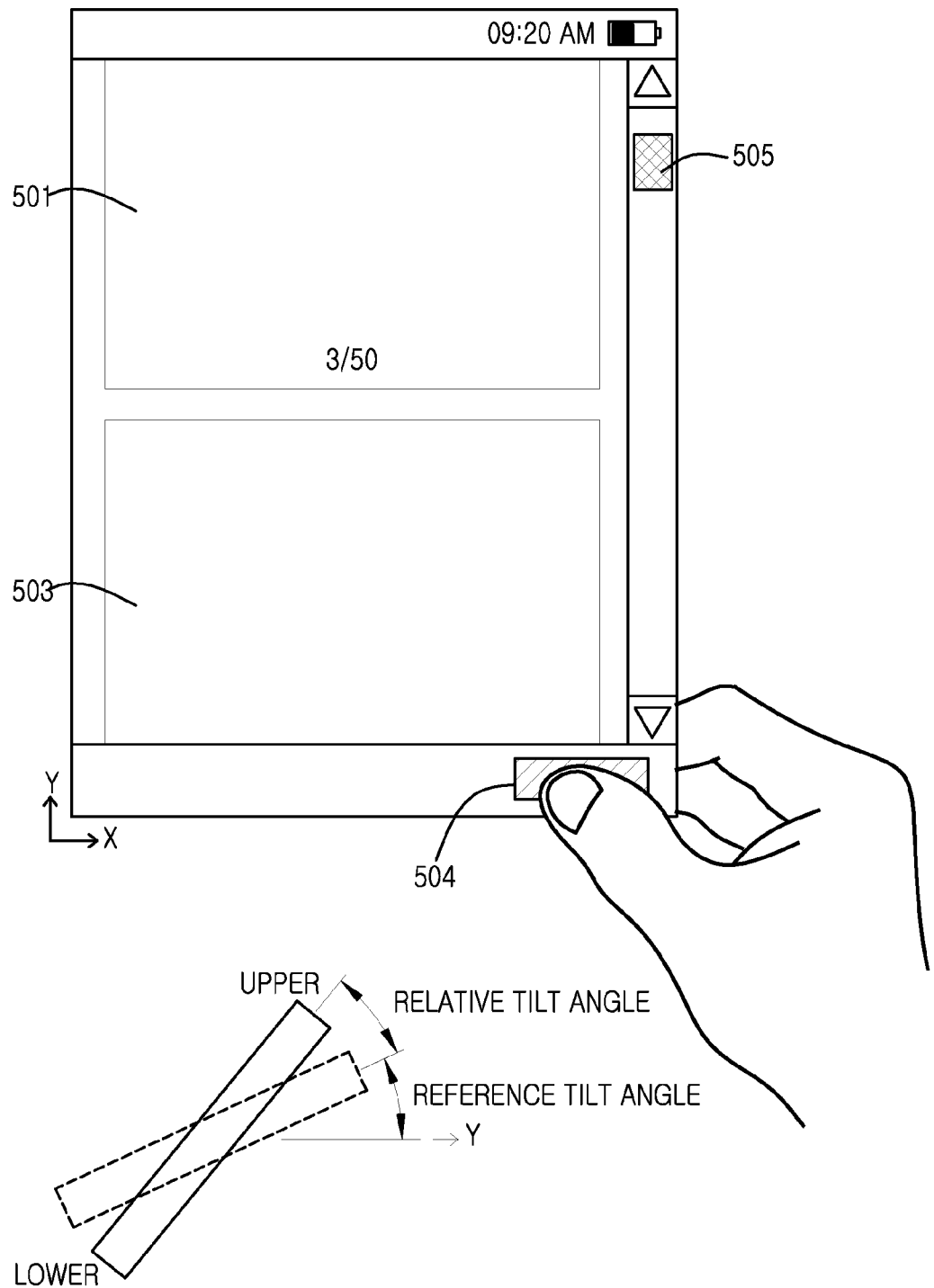
FIG. 5 illustrates a process of turning a page according to one embodiment of the present invention.

FIG. 5 illustrates a process of changing a page according to yet another embodiment of the present invention.

Referring to FIG. 5, an e-book terminal displays e-book contents on an upper page 501 and a lower page 503 of a picture. A user may read a lower page (next page) through a scroll-up type. The user may read e-book contents while scrolling up a lower page using a conventional scroll button 505. However, the e-book terminal according to the embodiment of the present invention provides a page change button 504 designating a reference tilt angle at the moment the user contacts that area 504. Thereafter, the user may change a page at a specific speed according to the tilt degree as described above with reference to FIG. 3. FIG. 5 differs from FIG. 3 in that the user must incline the e-book terminal at different orientation, i.e., upper and lower, to scroll a previous or next page.

In conclusion, an apparatus and method for changing a page in an e-book terminal according to different embodiments of the present invention changes a page when the e-book terminal is inclined. Because a page change speed is differently set according to an inclined angle, the user may easily change a page and may glance at e-book contents at a user's own speed.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for displaying contents in an electronic device, the method comprising:
in response to a touch input, detecting an angle at which the electronic device is inclined and setting the detected angle as a reference angle; and
detecting an inclination angle which the electronic device is inclined with respect to the reference angle and turning a current content to a next content or a previous content according to the inclination angle of the electronic device while the touch input is maintained,
wherein in response to detecting that the current content includes a particular item, pausing the turning of the current content to the next content or the previous content for a predetermined time period, and resuming the turning of the current content to the next content or the previous content when the predetermined time period expires.

2. The method of claim 1, wherein the turning of the current content comprises continuously turning content at a speed in proportion to a degree of to the inclination angle.

3. The method of claim 2, wherein the turning of the current content comprises:
defining a plurality of orientation ranges, each associated with a content turn speed, and turning the current content at a content turn speed corresponding to one of the plurality of orientation ranges matching the inclination angle at which the electronic device is inclined.

4. The method of claim 1, wherein the turning of the current content comprises:
turning the current content when the inclination angle at which the electronic device is inclined reaches a threshold value.

5. The method of claim 1, further comprising:
highlighting a specific item included in the current content.

6. The method of claim 1, further comprising:
displaying at least one content index in the contents indicating a particular content; and
in response to detecting the inclination angle to which the electronic device is inclined with respect to the reference angle, turning the current content to only the particular content until the touch input is released,
wherein the touch input is made to the at least one content index.

7. The method of claim 1, further comprising:
stopping the turning of the current content if the inclination angle of the electronic device is further tilted to exceed a threshold orientation.

8. The method of claim 1, wherein detecting the angle at which the electronic device is inclined comprises:
setting the reference angle with respect to a horizontal plane; and
detecting that the electronic device is inclined to a first inclination angle when the electronic device is rotated in a counterclockwise direction with respect to the reference angle, and detecting that the electronic device is inclined to a second inclination angle when the electronic device is rotated in a clockwise direction with respect to the reference angle.

9. The method of claim 8, further comprising:
turning the current content to the next content when the electronic device is inclined to the first inclination angle; and
turning the current content to the previous content when the electronic device is inclined to the second inclination angle.

10. The method of claim 1, wherein the touch input is held while setting the reference angle, detecting the inclination angle and turning the current content, the method further comprising releasing the reference angle when the touch input is released.

11. The method of claim 1, further comprising:
setting a bookmark for the current content if the inclination angle of the electronic device is further tilted to exceed a threshold orientation.

12. The method of claim 1, wherein the reference angle is a non-horizontal angle.

13. The method of claim 1, wherein the particular item includes at least one of a drawing and a graph.

14. An electronic device for displaying contents, the device comprising:
a tilt sensor configured to detect an inclination of the electronic device; and
a controller configured to:
in response to a touch input, detect, via the tilt sensor, an angle at which the electronic device is inclined and set the detected angle as a reference angle, and
detect, via the tilt sensor, an inclination angle to which the electronic device is inclined with respect to the reference angle and turn a current content to a next content or a previous content according to inclination angle of the electronic device while the touch input is maintained,
wherein in response to detecting that the current content includes a particular item, pausing the turning of the current content to the next content or the previous content for a predetermined time period, and resuming the turning of the current content to the next content or the previous content when the predetermined time period expires.

15. The device of claim 14, wherein the controller is further configured to continuously turn content at a speed in proportion to the inclination angle.

16. The device of claim 15, wherein the controller is further configured to define a plurality of orientation ranges, each associated with a content turn speed, and turn the current content at a content turn speed corresponding to one of the plurality of orientation ranges matching the inclination angle at which the electronic device is inclined.

17. The device of claim 14, wherein the controller is further configured to turn the current content when the inclination angle at which the electronic device is inclined reaches a threshold value.

18. The device of claim 14, wherein the controller is further configured to highlight a specific item included in the current content.

19. The device of claim 14, wherein the controller is further configured to
display at least one content index in the contents indicating a particular content; and
in response to detecting the inclination angle to which the electronic device is inclined with respect to the reference angle, turn the current content to only the particular content until the touch input is released,
wherein the touch input is made to the at least one content index.

20. The device of claim 14, wherein the controller is further configured to stop the turning of the current content if the inclination angle of the electronic device is further tilted to exceed a threshold orientation.

21. The device of claim 14, wherein the controller is further configured to:
set the reference angle with respect to a horizontal plane; and
detect that the electronic device is inclined to a first inclination angle when the electronic device is rotated in a counterclockwise direction with respect to the reference angle, and detect that the electronic device is inclined to a second inclination angle when the electronic device is rotated in a clockwise direction with respect to the reference angle.

22. The device of claim 21, the controller further configured to:
turn the current content to the next content when the electronic device is inclined to the first inclination angle; and
turn the current content to the previous content when the electronic device is inclined to the second inclination angle.

23. The device of claim 14, wherein the particular item includes at least one of a drawing and a graph.

* * * * *

UNITED STATES PATENT AND TRADEMARK OFFICE
CERTIFICATE OF CORRECTION

PATENT NO.         : 9,310,972 B2
APPLICATION NO.    : 13/351307
DATED              : April 12, 2016
INVENTOR(S)        : Young-Joo Lee Page 1 of 1

It is certified that error appears in the above-identified patent and that said Letters Patent is hereby corrected as shown below:

In the Claims

Column 6, Claim 2, Line 53 should read as follows:
--...degree of the inclination...--

Column 8, Claim 19, Lines 25-26 should read as follows:
--...configured to: display at...--

Signed and Sealed this
Seventh Day of June, 2016

Michelle K. Lee
*Director of the United States Patent and Trademark Office*